United States Patent [19]
Cunningham et al.

[11] Patent Number: 5,099,964
[45] Date of Patent: Mar. 31, 1992

[54] MULTIPLE DISC BRAKE

[75] Inventors: Sinclair Cunningham, Kinghorn, Scotland; Peter Wüsthof, Lohr, Fed. Rep. of Germany

[73] Assignee: Mannesmann Rexroth GmbH, Lohr, Fed. Rep. of Germany

[21] Appl. No.: 505,467

[22] Filed: Apr. 6, 1990

[30] Foreign Application Priority Data

Apr. 7, 1989 [DE] Fed. Rep. of Germany ....... 3911427

[51] Int. Cl.$^5$ .............................................. F16F 65/24
[52] U.S. Cl. ..................................... 188/170; 188/71.5
[58] Field of Search ..................... 188/170, 71.5, 71.6, 188/72.3, 18 A

[56] References Cited

U.S. PATENT DOCUMENTS

| | | | |
|---|---|---|---|
| 3,863,038 | 12/1990 | Kreitner et al. | 188/170 |
| 4,020,932 | 12/1990 | Windish | 192/4 A X |
| 4,491,202 | 12/1990 | Schmitt | 188/71.5 |

FOREIGN PATENT DOCUMENTS

| | | |
|---|---|---|
| 1480599 | 5/1969 | Fed. Rep. of Germany . |
| 3211366 | 10/1983 | Fed. Rep. of Germany . |
| 884501 | 12/1961 | United Kingdom . |
| 2131105 | 6/1984 | United Kingdom . |

Primary Examiner—Robert J. Oberleitner
Assistant Examiner—Chris Schwartz
Attorney, Agent, or Firm—Cushman, Darby & Cushman

[57] ABSTRACT

Braking apparatus, in particular braking apparatus, using discs for use together with a rotary disc support adapted to support a first set of discs. A brake housing is provided which support a second set of discs which are interdigitating with the first set. A brake piston is located in an opening of the brake housing in a reciprocable manner. A Spring biases the brake piston towards the first and second sets of discs. Separately from the brake piston a cover mounted at the brake housing is provided.

11 Claims, 2 Drawing Sheets

MULTIPLE DISC BRAKE

The invention relates generally to a braking apparatus, and, more particularly, to a multiple disc braking apparatus.

BACKGROUND ART

A multiple disk brake of the so called hydraulically relieved type uses an annular piston which is sealed against the brake housing by means of seals. Such a brake comprises a pressure chamber for supplying a pressure medium to apply the required relieve pressure. Such a braking apparatus is compact in size and uses a large brake piston which is suitable for a low relieve pressure. However, it is a disadvantage of that known brake apparatus, that the low amount of space required has to be achieved by means of a spring element mounted in the brake housing, a spring element which acts upon the brake piston. This single spring element has inherently a steep spring characteristic, i.e. for small movements of the spring a large change of the force is obtained. So as to provide for the required defined breaking forces, the components of that known brake apparatus have to have precise dimensions, a fact, which leads to high manufacturing and assembling costs.

It is an object of the present invention to overcome one or more of the problems of the prior art. It is another object of the present invention to provide a braking apparatus of compact design, particularly in axial direction, without having the disadvantages of close axial tolerances. In accordance with a further object of the invention the disadvantages which are due to a steep spring characteristic are to be avoided.

Additional brake apparatus of the prior art are shown in British patents 2,131,005 and 884,501 and also in German laid open applications 3,211,366 and 1,418,599.

DISCLOSURE OF THE INVENTION

The braking apparatus comprises a brake housing and a disc support. The brake housing carries a second set of discs. The discs (lamellas) of the first set are interdigitating with the discs of the second set. A brake piston is reciprocally mounted in an opening of the brake housing. The brake piston is biased by means of spring means towards the interdigitating discs of the first and the second sets. Separately from the brake piston a cover 8 is mounted at the brake housing.

In accordance with a preferred embodiment of the invention the spring means have a larger axial extension providing for a flat spring characteristic. Specifically, the spring means are in the form of a spring package, and the spring means are preferably located partially or totally within the rotating disc support which is to be braked. Due to the location of the spring package a compact design is achieved, inasmuch as the space receiving the spring package was not used so far.

Due to the use of a cover which is separate from the brake piston it is possible to provide for an easy adjustment of the spring force exerted by the spring package onto the brake piston. For instance, the adjustment means can have the form of a screw for mechanically adjusting the spring force. It is thus possible to precisely adjust the desired relief or venting pressure, and thus the desired holding force.

The invention makes sure that the entire relief or venting pressure acts upon the entire surface of the piston. Respective connections are provided by the design of the cooperating surfaces of the rotary disc support and the brake piston.

BRIEF DESCRIPTION OF THE DRAWINGS

For a better understanding of the present invention, reference may be made to the accompanying drawings, in which:

FIGS. 1 and 2 disclose a brake apparatus 1 in the form of a multiple disc (lamella) brake. The brake apparatus 1 is mounted at an assembly 2, for instance a hydraulic motor. The brake apparatus 1 is intended to apply a braking force to a shaft 3, which will be referred to below as a disc support. The brake apparatus 1 is substantially of a symmetric design with respect to the longitudinal axis 4.

The Assembly 2

Figure 1:
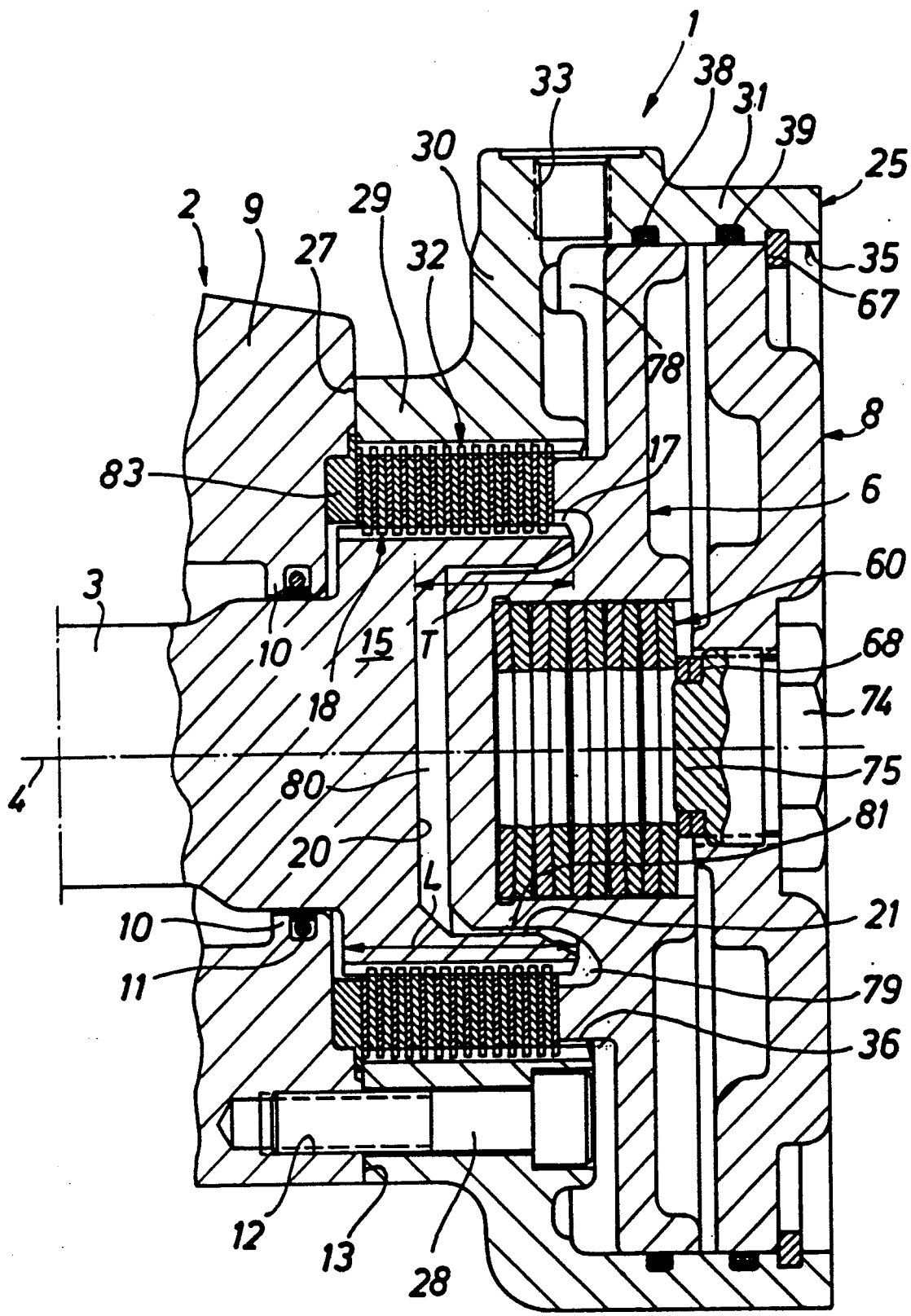
FIG. 1 a longitudinal cross sectional view of an embodiment of a brake apparatus of the invention, in the form of a multiple disc brake.

The assembly 2 comprises a housing 9 within which shaft 3 is rotatably mounted. Within an annular projection 10 of the housing 9 a seal 11 is located to provide a sealing effect between the inner space of the assembly 2 and the pressure medium of the brake apparatus 1. The brake apparatus 1 can be fixedly mounted at the end surface 13 of the housing 9, which is provided for said purpose with a plurality of threaded bores 12.

The shaft 3 forms a radial extension 15 having a length L and supporting at its outer circumference 17 a first set 18 of discs. The term discs refer to annular shaped friction discs.

The radial extension 15 is located substantially within the braking apparatus and forms at its free end a cup-shaped recess 20 having a depth T. The recess 20 is bordered by an annular wall 21. The annular wall 21 comprises an outwardly extending inclination 22. The annular wall 21 is also provided with a projection 23 carrying no discs. The depth T is preferably about two thirds of the length L of the radial extension 15.

The Braking Apparatus 1

The braking apparatus 1 comprises a substantially tube-shaped brake housing 25 and forms an annular end face 27 adapted for abutment at the end face 13 of housing 9. Bolts 28 extend through respective bores in the housing 25 and are screwed into the threaded bores 12, so as to fixedly mount the brake housing 25 to the housing 9.

The brake housing 25 forms—starting from the end face 27—a hub section 29, adjacent thereto a radial section 30, and adjacent thereto a horizontally extending end section 31. A pressure medium port 33 is located in the end section 31 adjacent to the radial section 30. The port 33 extends in radial direction. The brake housing 25 forms in the area of the end section 31 an opening 35. In the area of the hub section 29 the brake housing 25 forms an opening 36 with a smaller diameter. At the hub section 29 a second set 32 of discs is provided. The first and second sets of discs are arranged in an interdigitating relationship. A support plate 83 is provided, however, this support plate 83 could also be part of the housing 9.

At the inner wall of the end section 31 two annular grooves are provided to receive seals 38 and 39, respectively. In the opening 35 a brake piston 6 and a cover 8 are located adjacent to each other.

The brake piston 6 is generally disc-shaped and is provided in its central area with an axially extending projection 51. The brake piston 6 comprises a radially extending annular portion 41, adjacent thereto an axially extending cylinder portion 42 (forming the projection 51) and again, adjacent thereto a circularly shaped bottom portion 43. In that way, a recess 44 having a depth X is formed. Radially outwardly offset with regard to the projection 51, an annular bulge 47 is formed which also projects beyond the radial annular portion 41. The annular bulge 47 forms an annular abutment surface 48 for cooperation with the lamellas. The annular portion 41 widens towards the outer circumference of the brake piston 6 and forms a sliding surface 49 adapted to slide on a slide surface 50 on the opening 35.

Between the projection 51 and the annular bulge 47 an annular recess 52 is formed, into which the mentioned projection 23 extends if the brake apparatus is in its assembled condition. On the radially extending side of the brake piston 6 which faces away from the projection 51 a plurality of indentations 54 are formed by radially extending ribs. The brake piston forms pressure surfaces 55 and 56 which extend accross the entire radial extension of the piston.

The Spring Means 60

Figure 2:
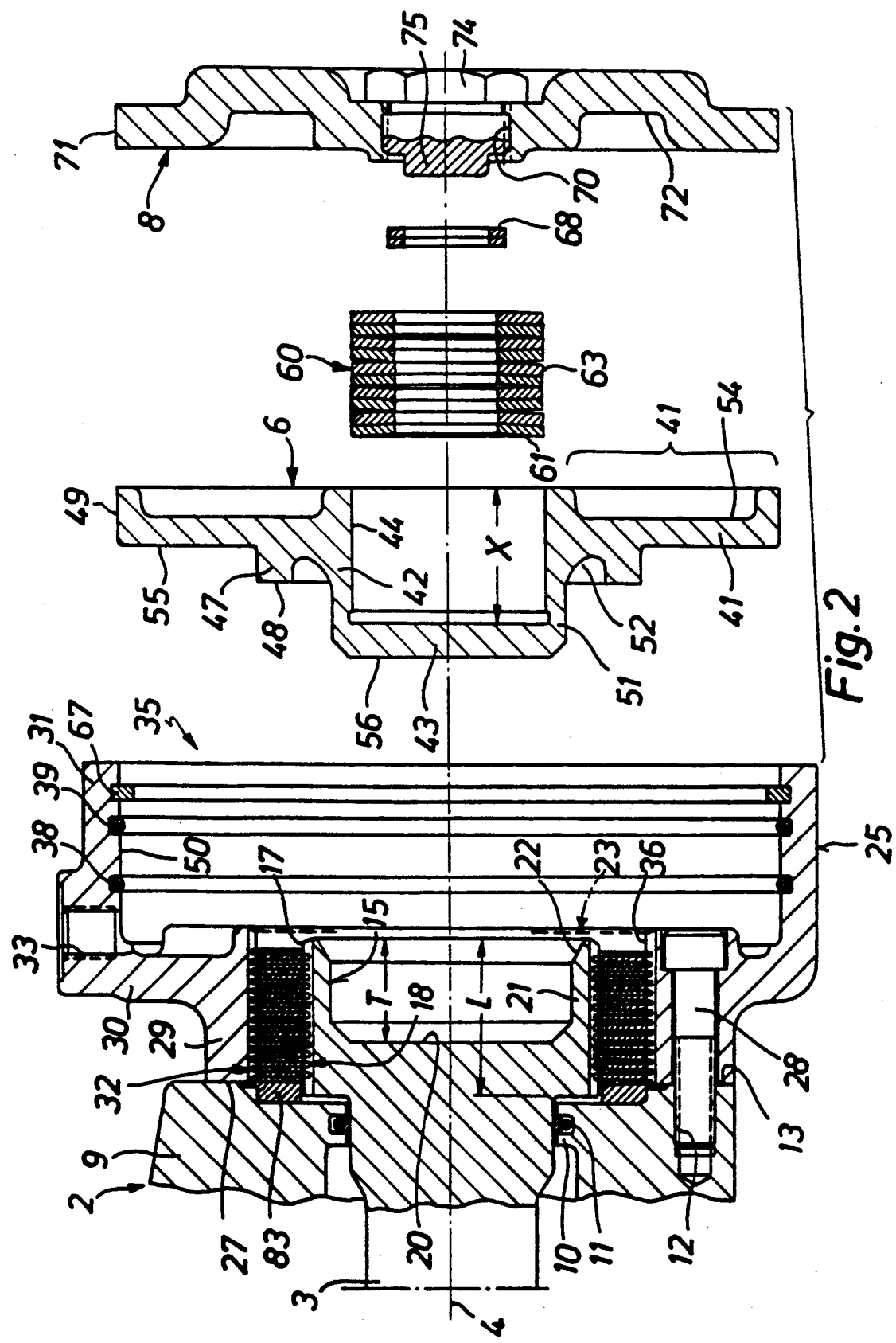
FIG. 2 a exploded view of the embodiment of the FIG. 1.

The spring means 60 do not consist of a single spring element comprising a steep spring characteristic, but consist of a spring element having a flat spring characteristic. Preferably, the spring means 60 are a so-called spring package, i.e. it comprises, as is shown in the drawing, of five spring groups which are shown in a substantially compressed condition. It should be noted that FIG. 2 does not directly show why the spring means 60 maintain the position which is shown. It will be recognized that the spring means 60, if assembled, abut with their abutment surface 61 at the bottom portion 43 of the recess 44, and they fit with their outer circumference 63 preferably precisely into the opening formed by the recess 44. The drawing discloses plate springs, however, instead of plate springs one or more cylindric springs can be used.

The Cover 8

The cover 8 of the invention is adapted to be inserted into the opening 35 after the brake piston 6 and the spring means 60 have been inserted. The cover 8 is held in its position by means of a locking ring 67. The cover 8 is provided at its outer circumference with a guiding surface 71 which is in engagement with the guiding surface 50. In the center of the cover 8 a threaded bore 70 is provided into which a mechanical actuator in the form of a screw 74 is inserted. The screw 74 provides an abutment for the spring means 60 via a pressure ring 68. Depending to what extend the screw 74 is screwed in or screwed out, the spring force of the spring package 60 can be adjusted. It is possible to adjust in this manner the desired venting or airing pressure and thus the holding force of the brake apparatus. An annular recess 72 is provided in the cover 8 and surrounds the threaded bore 70.

As known in the art, a pressure medium can be supplied via a pressure medium port 33 so as to release (vent) the brake apparatus more or less. If pressure medium with no or a low pressure is applied at 33, the braking apparatus will provide the highest possible amount of braking force due to the force of the spring means. Depending on how high the pressure at 33 is, the required braking effect will be adjusted. The pressure medium supplied at 33 first arrives at an annular pressure medium inlet space 78. From there, pressure medium flows around the annular bulge 47 into a connecting channel 79, and from there via the annular connection 81 to the pressure chamber or space 80. In this manner pressure medium acts upon the entire brake piston forming the pressure surfaces 55 and 56. The flow of the pressure medium from space 78 to connection channel 79 may also occur via the sets 18, 32 of the brake disk.

The pressure medium can be air or oil. Preferably, the pressue medium is oil.

We claim:

1. A braking apparatus comprising:
   a brake housing,
   a rotatable shaft serving as a disc support, and having an end which extends into the brake housing, said end having a radially and axially extending recess,
   a first set of discs supported by said rotatable shaft,
   a second set of discs supported by said brake housing and interdigitating with said first set of discs,
   a braking piston reciprocally mounted in an opening of the brake housing, said brake piston being of generally disc-shaped design and comprising at its center a projection defining a first recess,
   a cover separate from the brake piston and mounted to the brake housing,
   a spring package arranged between the brake piston and said cover and biased towards said first and second sets of discs, said spring package being at least partially located within said recess of said rotatable shaft, said spring package being insertable in said first recess, the spring package having opposite sides and being supported on one side by a bottom portion of the brake piston and on the other side by the cover, and
   means for adjusting the biasing force exerted by the spring package, the adjustment means being provided in the form of an adjustment screw adjustable from the outside.

2. The brake of claim 1, wherein the depth (X) of said recess corresponds in substance to the length of the spring package in its compressed condition.

3. The brake of claim 2, wherein the projection of the brake piston extends into a second recess, wherein for completely compressed discs a pressure medium space remains which is in connection with a pressure medium port.

4. The brake of claim 3, wherein the pressure medium space is connected via an annular connection and a connecting channel with a pressure medium inlet space, into which the pressure medium port leads.

5. The brake of claim 1, wherein the brake piston is provided with an annular bulge having an annular abutment surface which serves for the transmission of the spring force onto the interdigitating sets of discs.

6. The brake of claim 5, wherein radially with respect to the annular bulge an annular recess is provided.

7. The brake of claim 6, wherein in a housing of the assembly a seal is provided such that the exit of the pressure medium is avoided.

8. The brake of claim 7, wherein seals are provided in a horizontally extending end section of the brake housing so as to provide sealing of the piston and the cover, respectively, wherein said cover is held by a locking ring provided in the brake housing.

9. The brake of claim 1 wherein the spring package consisting of individual spring elements is a spring package of the plate spring type.

10. The brake of claim 1, wherein the spring package consisting of individual spring elements is a spring package of the cylinder spring type.

11. The brake of claim 1, wherein said rotatable shaft is the shaft of a hydraulic motor.

* * * * *